(12) United States Patent
Mattison et al.

(10) Patent No.: US 7,380,976 B2
(45) Date of Patent: Jun. 3, 2008

(54) DEVICE AND METHOD WITH COOLING JACKETS

(75) Inventors: Debra A. Mattison, Marion, NY (US); Mark C. Petropoulos, Ontario, NY (US); Mark S. Thomas, Williamson, NY (US); Sean X. Pan, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 553 days.

(21) Appl. No.: 11/183,407

(22) Filed: Jul. 18, 2005

(65) Prior Publication Data

US 2007/0014186 A1    Jan. 18, 2007

(51) Int. Cl.
  *B01F 15/06* (2006.01)
(52) U.S. Cl. .................. 366/149; 366/332; 165/109.1; 422/205
(58) Field of Classification Search ................ 366/144, 366/149, 181.5, 176.1–176.4, 336–340, 332; 422/202, 205, 225; 165/109.1, DIG. 318–DIG. 326; 138/40; 516/928–931
  See application file for complete search history.

(56) References Cited

U.S. PATENT DOCUMENTS

| | | | |
|---|---|---|---|
| 4,212,594 A | 7/1980 | Sheer, Jr. | |
| 4,247,262 A | 1/1981 | Lipstein | |
| 4,249,595 A | 2/1981 | Butt | |
| 4,533,254 A | 8/1985 | Cook et al. | |
| 4,600,052 A | 7/1986 | Wood, III et al. | |
| 4,601,040 A | 7/1986 | Andrews et al. | |
| 4,646,822 A | 3/1987 | Voggenreiter et al. | |
| 4,842,055 A | 6/1989 | Ohtsu | |
| 5,143,515 A | 9/1992 | Boster et al. | |
| 5,417,956 A | 5/1995 | Moser | |
| 5,492,654 A * | 2/1996 | Kozjuk et al. | ................ 261/76 |
| 5,810,052 A | 9/1998 | Kozyuk | |
| 5,937,906 A | 8/1999 | Kozyuk | |
| 6,365,555 B1 | 4/2002 | Moser et al. | |
| 6,502,979 B1 * | 1/2003 | Kozyuk | ................... 366/176.2 |
| 6,589,501 B2 | 7/2003 | Moser et al. | |

(Continued)

FOREIGN PATENT DOCUMENTS

JP           03241290 A  * 10/1991

OTHER PUBLICATIONS

Operation and Maintenance Manual for the CaviPro™ 500-TR25, Five Star Technologies, 36 pages, Aug. 2001.

*Primary Examiner*—Charles E Cooley
(74) *Attorney, Agent, or Firm*—Marylou J. Lavode, Esq., LLC

(57) ABSTRACT

A device comprising a flow channel having an inlet for introducing a flow of a first material, an outlet for exiting a flow of a second material; a plunger disposed and slidably movable coaxially within the flow channel; a first cooling device disposed adjacent to and substantially surrounding the flow channel comprising a housing having an internal sealable chamber for containing a first cooling fluid, an inlet having a first seal, and an outlet having a second seal, wherein the first cooling fluid is sealable within the sealable chamber; a second cooling device disposed adjacent to and substantially surrounding the first cooling device comprising a housing having an internal channel for a flow of a second cooling fluid, an inlet in fluid communication with the internal channel, an outlet in fluid communication with the channel, and a device for controlling the flow of second cooling fluid.

24 Claims, 2 Drawing Sheets

U.S. PATENT DOCUMENTS

| | | |
|---|---|---|
| 6,802,639 B2 | 10/2004 | Kozyuk |
| 6,935,770 B2 * | 8/2005 | Schueler .................. 366/174.1 |
| 7,284,899 B2 * | 10/2007 | Nakano .................. 366/176.1 |
| 7,314,306 B2 * | 1/2008 | Kozyuk .................. 366/176.2 |
| 2007/0014186 A1 * | 1/2007 | Mattison et al. ............ 366/149 |

* cited by examiner

DEVICE AND METHOD WITH COOLING JACKETS

TECHNICAL FIELD

The present disclosure relates to devices such as cavitation or homogenization devices and more particularly relates to a device and method for cooling such devices.

BACKGROUND

Hydrodynamic cavitation is widely known as a method used to obtain free disperse systems, particularly lyosols, diluted suspensions, and emulsions. Such free disperse systems are fluidic systems wherein dispersed phase particles have no contacts, participate in random beat motion, and freely move by gravity. Such dispersion and emulsification effects are accomplished within the fluid flow due to cavitation effects produced by a change in geometry of the fluid flow.

Hydrodynamic cavitation is the formation of cavities and cavitation bubbles filled with a vapor-gas mixture inside the fluid flow or at the boundary of the baffle body resulting from a local pressure drop in the fluid. If during the process of movement of the fluid the pressure at some point decreases to a magnitude under which the fluid reaches a boiling point for this pressure, then a great number of vapor-filled cavities and bubbles are formed. Insofar as the vapor-filled bubbles and cavities move together with the fluid flow, these bubbles and cavities may move into an elevated pressure zone. Where these bubbles and cavities enter a zone having increased pressure, vapor condensation takes place within the cavities and bubbles, almost instantaneously, causing the cavities and bubbles to collapse, creating very large pressure impulses. The magnitude of the pressure impulses within the collapsing cavities and bubbles may reach 150,000 pounds per square inch. The result of these high-pressure implosions is the formation of shock waves that emanate from the point of each collapsed bubble. Such high-impact loads result in the breakup of any medium found near the collapsing bubbles.

A dispersion process takes place when, during cavitation, the collapse of a cavitation bubble near the boundary of the phase separation of a solid particle suspended in a liquid results in the breakup of the suspension particle. An emulsification and homogenization process takes place when, during cavitation, the collapse of a cavitation bubble near the boundary of the phase separation of a liquid suspended or mixed with another liquid results in the breakup of drops of the disperse phase. Thus, the use of kinetic energy from collapsing cavitation bubbles and cavities, produced by hydrodynamic means, can be used for various mixing, emulsifying, homogenizing, and dispersing processes. These processes typically generate heat and require cooling systems to prevent or reduce thermal related damage to the devices, seals and other components, the reactants, and the reaction products.

Devices are known in the art which utilize the passage of a hydrodynamic flow through a cylindrical flow-through chamber internally accommodating a baffle body installed across and confronting the direction of the hydrodynamic flow to produce varied cavitations effects. The baffle element provides a local contraction of the flow as the fluid flow confronts the baffle element thus increasing the fluid flow pressure. As the fluid flow passes the baffle element, the fluid flow enters a zone of decreased pressure downstream of the baffle element thereby creating a hydrodynamic cavitation field. One such device is described in U.S. Pat. No. 5,492,654, which is totally incorporated by reference herein. Further patents of interest include U.S. Pat. Nos. 5,417,956, 6,365,555, 6,589,501, 5,810,052, 5,937,906, 6,502,979, and 6,802,639, the disclosures of each of which are totally incorporated by reference herein.

Various cooling devices and methods are known for cooling reactions. Such cooling devices are required to avoid or minimize heat damage to the reaction products, the reaction devices, or both. Reference, for example, U.S. Pat. Nos. 5,143,515, 4,842,055, 4,646,822, 4,601,040, 4,600,052, 4,249,595, 4,247,262, and 4,212,594, the disclosures of each of which are totally incorporated herein.

The disclosures of each of the foregoing U.S. Patents are each totally incorporated by reference herein in their entireties. The appropriate components and process aspects of the each of the foregoing U.S. Patents may be selected for the present invention in embodiments thereof.

A known device 10 for cooling a cavitation device 12 is shown in FIG. 1 (in order to focus on the cooling method, a portion of a representative cavitation device 12 is shown; elements of the cavitation device 12 not related to the cooling system 10 are not shown in FIG. 1). The representative cavitation device 12 includes a flow-through channel 14 for passing a fluid, indicated as arrow 16, such as a mixture of reaction components, such as a liquid and dispersants, such as, for example, a charge transport layer dispersion. The flow 16 of the liquid and dispersants enters the flow-through channel 14 through an inlet (not shown) in a first end 32 of the flow-through channel 14 moving in the direction of the arrow 16 and exiting through an outlet (not shown) in a second end 36 of the flow-through channel 14. A plunger 18 slidably movable coaxially within the flow through chamber to effect the creation and control of cavitation fields is disposed at least partially within the flow-through channel 14. The plunger 18 is surrounded by a sealed solvent jacket 20 which includes a solvent housing 22 for containing a cooling solvent 24, a solvent inlet 26 and a solvent outlet 28. The solvent jacket 20 includes a regular or low pressure seal 30 at the first end 32 of the flow-through channel 14 and a high pressure seal 34 at the second opposite end 36 of the flow-through channel 14. Without cooling, the seals are heated up and eventually melt. It has been proposed to pass the solvent 24 through a solvent refrigeration loop (refrigeration device not shown) to cool the plunger seals while also employing a separate water loop to cool the solvent.

There remains a need for a cooling device and method for cavitation type devices that is less costly and less complicated than currently available devices. There is further a need for a device and method for cooling and lubricating such devices without contamination of seals, other parts, and reaction or dispersant materials due to seal damage from over heating.

SUMMARY

Disclosed are non-contact cooling devices and methods for non-contact cooling of high pressure plungers employed in cavitation type devices having a flow through channel for flowing a reaction fluid such as a liquid and dispersant or other reaction components, and reacting, mixing, homogenizing, dispersing, etc., therein to produce a reaction product. As used herein, the terms "cavitation device" or "cavitation type device" include cavitation devices, mixers, homogenization devices, and other reaction vessels wherein one or more reaction components are introduced into a flow-through channel and a cavitation effect is introduced or the reaction components are otherwise mixed, homogenized, dispersed or reacted to produce a reaction product. Disclosed devices comprise a flow-through channel having an inlet for introducing a flow of a first material or materials, and an outlet for exiting a flow of a second material or materials; a plunger disposed and slidably movable coaxially within the flow through channel; a first cooling device disposed adjacent to and substantially surrounding the flow channel, the first cooling device comprising a housing having an internal sealable chamber for containing a first cooling fluid, which can be, for example, a liquid or a gas, an inlet having a first seal, and an outlet having a second seal, wherein the first cooling liquid is sealable within the sealable chamber; and a second cooling device disposed adjacent to and substantially surrounding the first cooling device; the second cooling device comprising a housing having an internal channel for a flow of a second cooling material, which can be, for example, a liquid or a gas, that can be, for example, different from the first cooling material or the same as the first cooling material, an inlet in fluid communication with the internal channel, an outlet in fluid communication with the channel, and a device for controlling the flow of second cooling liquid through the second cooling device. In embodiments, the first cooling material and the second cooling material comprise different materials, for example, the first cooling material comprises a first liquid and the second cooling material comprises a second liquid that is different from the first liquid.

For example, the non-contact cooling device comprises a sealable solvent loop surrounded by a cooled water jacket. The water jacket serves to cool the solvent via conduction through the wall of the water housing. The water cooled solvent in turn cools and lubricates the plunger, with the motion of the plunger serving as a stirrer to induce flow of the solvent and enhance heat exchange. The system maintains use of solvent (not water) in contact with the plunger seals while eliminating the need for a separate solvent cooling loop. The devices allow use of water as a cooling medium while the plunger seal ensures minimal leakage of the product solution. As used herein, the term "non-contact cooling device" refers to a cooling device wherein water does not contact the high pressure plunger or product being processed. The device and method provide a way to keep the main cooling media (for example, water) from contacting critical process areas (such as seals) that are problematic for leakage causing contamination of the process solution and/or damage to the device. The cooling device and method, particularly for cavitation type devices, is less costly and less complicated to make than currently available devices. Further a device and method is provided for cooling and lubricating such devices without contamination of seals, other parts, and materials. For example, a solvent cooling material is provided that is similar to the solvent reaction materials or liquid/dispersants to reduce or eliminate crosstalk.

Aspects illustrated herein relate to a device comprising a flow-through channel having an inlet for introducing a flow of a first material or materials, and an outlet for exiting a flow of a second material or materials; a plunger disposed and slidably movable coaxially within the flow through channel; a first cooling device disposed adjacent to and substantially surrounding the flow channel, the first cooling device comprising a housing having an internal sealable chamber for containing a first cooling fluid, an inlet having a first seal, and an outlet having a second seal, wherein the first cooling fluid is sealable within the sealable chamber; and a second cooling device disposed adjacent to and substantially surrounding the first cooling device; the second cooling device comprising a housing having an internal channel for a flow of a second cooling fluid, an inlet in fluid communication with the internal channel, an outlet in fluid communication with the channel, and a device for controlling the flow of second cooling fluid through the second cooling device. Devices herein include, for example, cavitation devices, mixers, homogenizers, or reaction vessels. The device and method is particularly suitable for cavitation and cavitation-type devices. In embodiments, the first cooling device includes a first seal disposed to seal the flow-through chamber at a first end of the flow-through channel and a second, high pressure seal disposed to seal the flow-through chamber at a second, opposite end of the flow-through channel. For example, the plunger, slidaby movable within the flow through channel, is a "high pressure" plunger having a low pressure seal at the plunger entry end of the flow through channel and wherein the plunger exits at the flow through channel via a high pressure seal at an opposite, exit end of the flow through channel. The first cooling device can comprise, for example, a solvent cooling device wherein the first cooling liquid is a solvent. The second cooling device can comprise, for example, a water cooling device wherein the second cooling liquid is water. In embodiments, the first cooling device includes a first inlet seal such as a solvent inlet seal and a second outlet seal such as a solvent outlet seal to seal the first cooling liquid within the liquid chamber, for example, solvent chamber. The second cooling device can include, for example, a device for controlling the flow of the second cooling liquid comprising a pump, a diaphragm pump, a gear pump, or a peristaltic pump. For example, a water cooling device containing a water cooling liquid can include a device for controlling a flow of water such as a water pump, a diaphragm pump, a gear pump, or a peristaltic pump. The flow of first material or materials can comprise, for example, a flow of reactants or a flow of liquid and dispersants and the flow of a second material or materials can comprise a flow of reaction product or a flow of a liquid having materials dispersed therein. In embodiments, the flow of first material or materials is a flow of liquid and dispersants including a solvent, the first cooling device is a solvent cooling device and the first cooling liquid is a solvent comprising the same solvent as the flow of first material or materials.

Further aspects illustrated herein relate to a device comprising a flow-through channel having an inlet for introducing a flow of reactants, and an outlet for exiting a reaction product; a plunger disposed and slidably movable coaxially within the flow through channel; a solvent cooling device disposed adjacent to and substantially surrounding the flow channel, the solvent cooling device comprising a housing having an internal sealable solvent chamber for containing a cooling solvent, a solvent inlet having a first solvent seal, and a solvent outlet having a second solvent seal, wherein the cooling solvent is sealable within the solvent chamber; and a water cooling device disposed adjacent to and substantially surrounding the solvent cooling device; the water cooling device comprising a housing having an internal water channel, a water inlet in fluid communication with the internal water channel, a water outlet in fluid communication with the water channel, and a device for controlling the flow of water through the water cooling device.

Still further aspects disclosed herein relate to a method for cooling a device comprising introducing a flow of a first material or materials into a flow through channel having an inlet for introducing the flow of first material or materials, and an outlet for exiting a flow of a second material or materials; mixing the flow of the first material or materials with a plunger disposed within and slidably movable coaxially within the flow-through channel; cooling the flow through channel with a first cooling device disposed adjacent to and substantially surrounding the flow through channel, the first cooling device comprising a housing having an internal sealable chamber for containing a first cooling fluid, an inlet having a first seal, and an outlet having a second seal, wherein the first cooling fluid is sealed within the chamber; wherein the plunger disposed within the flow through channel further serves as a stirrer to induce flow of the first cooling fluid and enhance heat exchange; and cooling the first cooling device with a flow of a second cooling fluid from a second cooling device disposed adjacent to and substantially surrounding the first cooling device; the second cooling device comprising a housing having an internal channel, an inlet in fluid communication with the internal channel, an outlet in fluid communication with the internal channel, a device for controlling the flow of the second cooling fluid through the second cooling device.

These and other features and advantages of the invention will be more fully understood from the following description of certain specific embodiments of the invention taken together with the accompanying drawings wherein like elements are numbered alike in the figures.

DESCRIPTION

Figure 1:
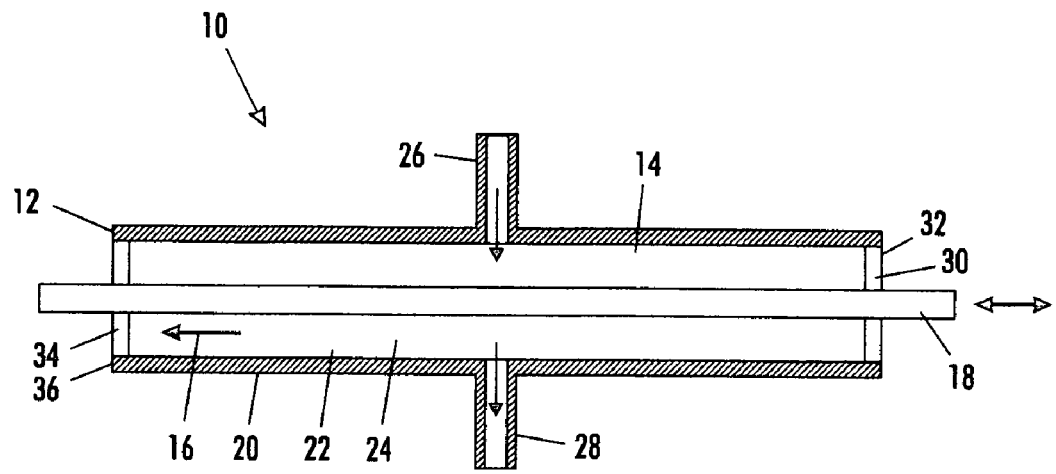
FIG. 1 is a longitudinal view of a prior art cavitation cooling device and method.

Aspects illustrated herein relate to a device comprising a flow-through channel having an inlet for introducing a flow of a first material or materials, and an outlet for exiting a flow of a second material or materials; a plunger disposed and slidably movable coaxially within the flow through channel; a first cooling device disposed adjacent to and substantially surrounding the flow channel, the first cooling device comprising a housing having an internal sealable chamber for containing a first cooling fluid, which can be, for example, a liquid or a gas, an inlet having a first seal, and an outlet having a second seal, wherein the first cooling liquid is sealable within the sealable chamber; and a second cooling device disposed adjacent to and substantially surrounding the first cooling device; the second cooling device comprising a housing having an internal channel for a flow of a second cooling material, which can be, for example, a liquid or a gas, that can be, for example, different from the first cooling material or the same as the first cooling material, an inlet in fluid communication with the internal channel, an outlet in fluid communication with the channel, and a device for controlling the flow of second cooling liquid through the second cooling device. In embodiments, the first cooling material and the second cooling material comprise different materials, for example, the first cooling material comprises a first liquid and the second cooling material comprises a second liquid that is different from the first liquid. Optionally, a plurality of successive cooling devices can be provided.

Devices herein include, for example, cavitation devices, mixers, homogenizers, or reaction vessels. The device and method is particularly suitable for cavitation and cavitation-type devices. In embodiments, the first cooling device includes a first seal disposed to seal the flow-through chamber at a first end of the flow-through channel and a second, high pressure seal disposed to seal the flow-through chamber at a second, opposite end of the flow-through channel. For example, the plunger, slidaby movable within the flow through channel, is a "high pressure" plunger having a low pressure seal at the plunger entry end of the flow through channel and wherein the plunger exits at the flow through channel via a high pressure seal at an opposite, exit end of the flow through channel. The plunger is used to create the high pressure causing cavitations. For example, in preparing charge transport layer dispersions comprising polytetrafluoroethylene (PTFE), this is the main mechanism for providing energy to the solution to disperse the PTFE. The inlet side of the plunger is low pressure and has low pressure seals, low pressure meaning, for example, about 5 pounds per square inch (psi) to about 25 psi. The outlet side of the plunger is high pressure and has high pressure seals, high pressure meaning, for example, about 2,000 psi to about 30,000 psi. The mechanism along with the charge transport layer solution itself requires cooling. The first cooling device can comprise, for example, a solvent cooling device wherein the first cooling liquid is a solvent. The second cooling device can comprise, for example, a water cooling device wherein the second cooling liquid is water. In embodiments, the first cooling device includes a first inlet seal such as a solvent inlet seal and a second outlet seal such as a solvent outlet seal to seal the first cooling liquid within the liquid chamber, for example, solvent chamber. The second cooling device can include, for example, a device for controlling the flow of the second cooling liquid comprising a pump, a diaphragm pump, a gear pump, or a peristaltic pump. For example, a water cooling device containing a water cooling liquid can include a device for controlling a flow of water such as a water pump, a diaphragm pump, a gear pump, or a peristaltic pump. The water flow rate can comprise, for example, a flow rate of about 4 liters per minute to about 5 liters per minute. The cooling material, flow rate, etc., is selected to maintain the device and reaction materials/products at a desired temperature as is suitable for the particular application. For example, for charge transport layer dispersions, a temperature range can be selected at, but not limited to, about 15° C. to about 50° C. The flow of first material or materials can comprise, for example, a flow of reactants or a flow of liquid and dispersants and the flow of a second material or materials can comprise a flow of reaction product or a flow of a liquid having materials dispersed therein. In embodiments, the flow of first material or materials is a flow of liquid and dispersants including a solvent, the first cooling device is a solvent cooling device and the first cooling liquid is a solvent comprising the same solvent as the flow of first material or materials. Therefore, the solvent cooling loop cools the plunger (and is itself cooled by the water coolant device/heat exchanger) such that even if there is a solvent leak, any leak is in common with the solution being processed (that is, the first material or materials such as dispersant and solvent liquid).

Further aspects illustrated herein relate to a device comprising a flow-through channel having an inlet for introducing a flow of reactants, and an outlet for exiting a reaction product; a plunger disposed and slidably movable coaxially within the flow through channel; a solvent cooling device disposed adjacent to and substantially surrounding the flow channel, the solvent cooling device comprising a housing having an internal sealable solvent chamber for containing a cooling solvent, a solvent inlet having a first solvent seal, and a solvent outlet having a second solvent seal, wherein the cooling solvent is sealable within the solvent chamber; and a water cooling device disposed adjacent to and substantially surrounding the solvent cooling device; the water cooling device comprising a housing having an internal water channel, a water inlet in fluid communication with the internal water channel, a water outlet in fluid communication with the water channel, and a device for controlling the flow of water through the water cooling device.

Still further aspects disclosed herein relate to a device comprising a flow-through channel having an inlet for introducing a flow of reactants, and an outlet for exiting a reaction product; a plunger disposed and slidably movable coaxially within the flow through channel; a solvent cooling device disposed adjacent to and substantially surrounding the flow channel, the solvent cooling device comprising a housing having an internal sealable solvent chamber for containing a cooling solvent, a solvent inlet having a first solvent seal, and a solvent outlet having a second solvent seal, wherein the cooling solvent is sealable within the solvent chamber; and a water cooling device disposed adjacent to and substantially surrounding the solvent cooling device; the water cooling device comprising a housing having an internal water channel, a water inlet in fluid communication with the internal water channel, a water outlet in fluid communication with the water channel, and a device for controlling the flow of water through the water cooling device.

Figure 2:
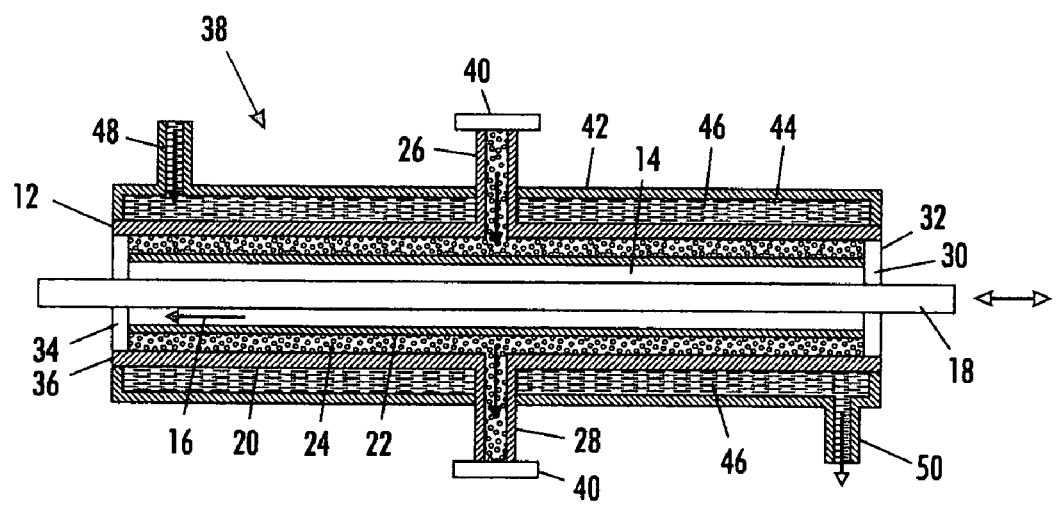
FIG. 2 is a cross-sectional view taken along a longitudinal section of a cavitation or homogenization type device employing non-contact cooling as presently disclosed.
Figure 3:
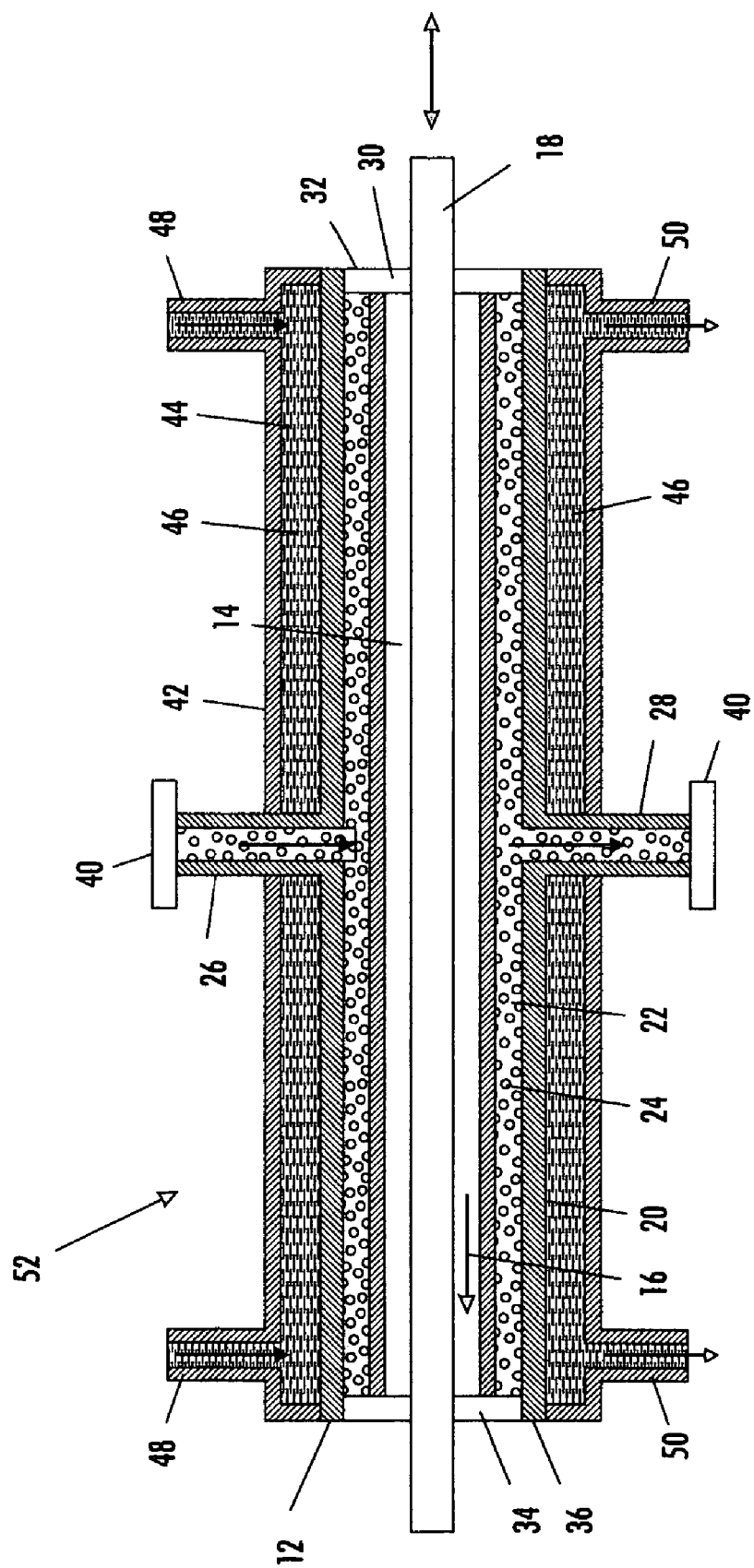
FIG. 3 is a cross-sectional view taken along a longitudinal section of an alternate embodiment of the present non-contact cooling device and method.

FIGS. 2 and 3 illustrate embodiments of the present non-contact cooling device and method wherein like elements of the device shown in FIG. 1 are labeled similarly in FIGS. 2 and 3. The present cooling device 38 is shown in relation to a cavitation type device 12 (cavitation type device 12 shown partially in order to focus on the aspects of the present device and method related to non-contact cooling) having a flow-through channel 14 for passing a flow of reactants indicated as arrow 16, "flow of reactants" used herein to indicate one or more components such as a first material or materials, a mixture of a liquid and dispersants, such as, for example, electron transport materials in an undercoat layer such as $TiO_2$, a charge transport layer dispersion, charge generating pigments in a charge generation layer, such as phthalocyanine pigments, or other combination of components which are reacted, mixed, dispersed, homogenized or otherwise affected within the flow-through channel to produce a flow of a second material or materials, such as a reaction product or a dispersant or dispersants dispersed in a material such as a liquid. The flow 16 of, for example, liquid and dispersants, enters the flow-through channel 14 through an inlet (not shown) in a first end 32 of the flow-through channel 14 moving in the direction of the arrow 16 and exiting through an outlet (not shown) in a second end 36 of the flow-through channel 14. A mixing or cavitation inducing device 18, such as a plunger 18 slidably movable coaxially within the flow through chamber to effect the creation and control of cavitation fields, is at least partially disposed within the flow-through channel 14. The flow-through channel 14 is substantially surrounded by a sealed solvent jacket (housing) 20 which includes a solvent chamber 22 for containing a cooling solvent 24, a sealable solvent inlet 26 and a sealable solvent outlet 28. The solvent jacket 20 includes a regular or low pressure seal 30 at the first or inlet end 32 of the flow-through channel 14 and a high pressure seal 34 at the outlet or second opposite outlet 36 of the flow-through channel 14.

A water housing 42 forms a water chamber 44 for flowing a cooling supply of water 46. Water 46 enters the water chamber 44 through water inlet 48 and exits the water chamber 44 through water outlet 50. A device may be employed for controlling and regulating the flow of water may be employed such as, for example, a water pump, a diaphragm pump, gear pump, or peristaltic pump (not shown) or other device. The water housing 42 is disposed adjacent the solvent chamber 22 in a configuration sufficient to cool the solvent 24. For example, the water housing 42 is shown in FIG. 2 as substantially surrounding the solvent chamber 22. The water cooled solvent 24 in turns cools the reaction product, plunger 18 and seals 30, 34.

In FIG. 3, another embodiment of the present non-contact cooling device and method includes a non-contact cooling device 52 comprising multiple water inlets 48 and multiple water outlets 50. The provision of selectively located multiple water inlets 48 and outlets 50 enables additional control of the flow and placement of cooling water thereby enhancing regulation of the cooling effect of the water 46 on the system.

In utilization of the cooling devices 38, 52 prior to staring the mixer or other agitation element of the cavitation device 12, the solvent chamber 22 is drained and cleaned. The solvent outlet 28 is connected to a tubing (not shown) and the tubing is lifted to the height of the solvent inlet 26. Solvent 24 is added through the solvent inlet 26 to a desired fullness. Solvents may include any solvent, for example, suitable solvents include solvents that are that same as, or compatible with, the solution being processed. Examples of solvents include, but are not limited to, methanol, ethyl alcohol, isopropyl alcohol, n-butyl alcohol, toluene, tetrahydrofuran, n-butyl acetate, acetyl acetate, xylene, methylene chloride, and monochlorobenzene, among others. Optionally, for example, the solvent 24 may be added in an amount that allows a quantity of air to remain in the chamber 22, air comprising a good mixing media. Upon filling the solvent chamber 22 with solvent, the solvent inlet 26 and solvent outlet 28 are sealed with an appropriate sealing device 40, such as seals 40 comprising, for example, Teflon™ seals. The cooling water flow 46 is turned on and the mixer is then started.

The present non-contact cooling device and method provide the advantages of a simplified single cooling media (for example, water) for both reaction product and plunger, and an easy to control coolant system. Overheating of the seals is prevented, thus preventing plunger seal damage and resultant leakage of dispersion solution past the seal. Further, the cost, complexity, and safety issues found with prior systems employing a solvent refrigeration loop is avoided. The non-contact cooling device and method is particularly useful for cavitation mixers and similar devices but is not limited thereto and is contemplated as being applicable to devices for preparing other dispersions, particularly where high pressure is used.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A device comprising:
   a flow-through channel having an inlet for introducing a flow of a first material or materials, and an outlet for exiting a flow of a second material or materials;
   a plunger disposed and slidably movable coaxially within the flow through channel;
   a first cooling device disposed adjacent to and substantially surrounding the flow channel, the first cooling device comprising a housing having an internal sealable chamber for containing a first cooling fluid, an inlet having a first seal, and an outlet having a second seal, wherein the first cooling fluid is sealable within the sealable chamber; and
   a second cooling device disposed adjacent to and substantially surrounding the first cooling device; the second cooling device comprising a housing having an internal channel for a flow of a second cooling fluid, an inlet in fluid communication with the internal channel, an outlet in fluid communication with the channel, and a device for controlling the flow of second cooling fluid through the second cooling device.

2. The device of claim 1, wherein the first cooling fluid and the second cooling fluid are selected from a liquid or a gas.

3. The device of claim 1, wherein the second cooling fluid is different from the first cooling fluid.

4. The device of claim 1, wherein the device is a cavitation device, a mixer, a homogenizer, or a reaction vessel.

5. The device of claim 1, wherein the first cooling device includes a first seal disposed to seal the flow-through chamber at a first end of the flow-through channel and a second, high pressure seal disposed to seal the flow-through chamber at a second, opposite end of the flow-through channel.

6. The device of claim 1, wherein the first cooling device is a solvent cooling device and the first cooling fluid is a solvent.

7. The device of claim 1, wherein the second cooling device is a water cooling device and the second cooling fluid is water.

8. The device of claim 1, wherein the first cooling device includes a first inlet seal and a second outlet seal to seal the first cooling fluid within the fluid chamber.

9. The device of claim 1, wherein first cooling device is a solvent cooling device comprising a solvent inlet seal and a solvent outlet seal to seal the solvent within the chamber.

10. The device of claim 1, wherein the second cooling device includes a device for controlling the flow of the second cooling fluid comprising a pump, a diaphragm pump, a gear pump, or a peristaltic pump.

11. The device of claim 1, wherein the second cooling device is a water cooling device and the second cooling fluid is water, including a device for controlling a flow of water comprising a water pump, a diaphragm pump, a gear pump, or a peristaltic pump.

12. The device of claim 1, wherein the flow of first material or materials is a flow of reactants and the flow of a second material or materials is a flow of reaction product.

13. The device of claim 1, wherein the flow of first material or materials is a flow of liquid and dispersants.

14. The device of claim 1, wherein the flow of first material or materials is a flow of liquid and dispersants including a solvent, and wherein the first cooling device is a solvent cooling device and the first cooling fluid is a solvent comprising the same solvent as the flow of first material or materials.

15. A device comprising:
   a flow-through channel having an inlet for introducing a flow of reactants, and an outlet for exiting a reaction product;
   a plunger disposed and slidably movable coaxially within the flow through channel;
   a solvent cooling device disposed adjacent to and substantially surrounding the flow channel, the solvent cooling device comprising a housing having an internal sealable solvent chamber for containing a cooling solvent, a solvent inlet having a first solvent seal, and a solvent outlet having a second solvent seal, wherein the cooling solvent is sealable within the solvent chamber; and
   a water cooling device disposed adjacent to and substantially surrounding the solvent cooling device; the water cooling device comprising a housing having an internal water channel, a water inlet in fluid communication with the internal water channel, a water outlet in fluid communication with the water channel, and a device for controlling the flow of water through the water cooling device.

16. The device of claim 15, wherein the device is a cavitation device, a mixer, a homogenizer, or a reaction vessel.

17. The device of claim 15, wherein the solvent cooling device includes a first seal disposed to seal the flow-through chamber at a first end of the flow-through channel and a second, high pressure seal disposed to seal the flow-through chamber at a second, opposite end of the flow-through channel.

18. The device of claim 15, wherein the second cooling device is a water cooling device and the liquid is water, including a device for controlling a flow of water comprising a water pump, a diaphragm pump, a gear pump, or a peristaltic pump.

19. The device of claim 15, wherein the flow of reactants comprises a flow of liquid and dispersants.

20. The device of claim 15, wherein the flow of reactants is a flow of liquid and dispersants including a solvent, and wherein the cooling solvent comprises the same solvent as the flow of liquid and dispersants including a solvent.

21. A method for cooling a device comprising:
   introducing a flow of a first material or materials into a flow through channel having an inlet for introducing the flow of first material or materials, and an outlet for exiting a flow of a second material or materials;
   mixing the flow of the first material or materials with a plunger disposed within and slidably movable coaxially within the flow-through channel;
   cooling the flow through channel with a first cooling device disposed adjacent to and substantially surrounding the flow through channel, the first cooling device comprising a housing having an internal sealable chamber for containing a first cooling fluid, an inlet having a first seal, and an outlet having a second seal, wherein the first cooling fluid is sealed within the chamber;
   wherein the plunger disposed within the flow through channel further serves as a stirrer to induce flow of the first cooling fluid and enhance heat exchange; and
   cooling the first cooling device with a flow of a second cooling fluid from a second cooling device disposed adjacent to and substantially surrounding the first cooling device; the second cooling device comprising a housing having an internal channel, an inlet in fluid communication with the internal channel, an outlet in fluid communication with the internal channel, a device for controlling the flow of the second cooling fluid through the second cooling device.

22. The method of claim 21, wherein the first cooling fluid and the second cooling fluid are selected from a liquid or a gas.

23. The method of claim 21, wherein the second cooling fluid is different from the first cooling fluid.

24. The method of claim 21, wherein the flow of first material or materials is a flow of liquid and dispersants including a solvent, and wherein the first cooling device is a solvent cooling device and the first cooling fluid is a solvent comprising the same solvent as the flow of first material or materials.

* * * * *